United States Patent [19]
Hurko

[11] 3,845,273
[45] Oct. 29, 1974

[54] COMPOSITE METAL PLATE SURFACE HEATING UNIT

[75] Inventor: Bohdan Hurko, Louisville, Ky.

[73] Assignee: General Electric Company, Louisville, Ky.

[22] Filed: Nov. 28, 1973

[21] Appl. No.: 419,592

[52] U.S. Cl............... 219/462, 165/185, 219/461, 219/463, 219/464, 219/530
[51] Int. Cl. ............................................. H05b 3/68
[58] Field of Search .......... 219/430, 435, 436, 437, 219/438, 439, 441, 442, 459, 461, 462, 463, 464, 530, 535, 540; 165/185

[56] References Cited
UNITED STATES PATENTS

| | | | |
|---|---|---|---|
| 2,443,806 | 6/1948 | Shafter | 219/436 |
| 2,492,397 | 12/1949 | Peterson | 219/530 UX |
| 2,570,975 | 10/1951 | Osterheld | 219/459 |
| 2,969,452 | 1/1961 | Geller | 219/437 X |
| 3,097,289 | 7/1963 | Clark | 219/442 X |
| 3,272,968 | 9/1966 | Volker | 219/535 |
| 3,445,630 | 5/1969 | Ulam | 219/438 |
| 3,569,672 | 3/1971 | Hurko | 219/464 |
| 3,622,754 | 11/1971 | Hurko | 219/462 |
| 3,644,710 | 2/1972 | Drugmand et al. | 219/463 |
| 3,781,522 | 12/1973 | Borom | 219/462 |

Primary Examiner—Volodymyr Y. Mayewsky
Attorney, Agent, or Firm—Richard L. Caslin; Francis H. Boos

[57] ABSTRACT

A low thermal mass, solid plate surface heating unit having a top utensil-supporting surface of composite metal of high thermal conductivity and corrosion and oxidation resisting materials. A metal sheathed electrical resistance heating element is pressed against the underside of the composite plate by an embossed back-up plate. This back-up plate is attached to the composite plate at a plurality of points that are spaced from the heating element so as to allow limited sliding movement between the heating element and the composite plate and thereby prevent warpage of the composite plate.

4 Claims, 2 Drawing Figures

PATENTED OCT 29 1974 3,845,273

COMPOSITE METAL PLATE SURFACE HEATING UNIT

BACKGROUND OF THE INVENTION

For many years, electric surface cooking has been performed on metal sheathed electical resistance heating elements of spiral configuration. In many foreign countries electric surface cooking is performed on cast iron solid plate units where the resistance heating elements are either embedded therein or permanently fastened thereto.

One important advantage of a solid plate surface heating unit is its ease of cleanability since there are no holes through which spillovers and boilovers may pour and become difficult to reach for the removal thereof. One important shortcoming of the cast iron surface unit plates is their high thermal mass and slow heatup and cool down rates as well as their somewhat unattractive appearances.

An important advance in the art of solid plate surface heating units is taught in my earlier U.S. Pat. No. 3,569,672 entitled LOW THERMAL MASS, PLATE SURFACE HEATING UNIT. This patent taught the use of a composite metal plate for a solid plate surface heating unit except the sheath of the heating element was brazed or otherwise attached along the length thereof to the underside of the composite plate. The brazing operation requires very high temperatures, and the brazing material adds considerable weight to the overall weight or thermal mass of the surface unit. Also, it is important that the heater coils be very flat for a proper brazing operation and temperature differences between the heating element and the composite plate tend to set up high stress concentrations. Moreover, the brazing operation is a costly operation which represents a large share of the overall cost of the surface unit.

The principle object of the present invention is to provide a composite metal plate surface heating unit with a heat source of a metal sheathed electrical resistance heating element that is maintained in contact with the composite plate yet capable of limited sliding movement due to temperature differences between the composite plate and the heating element.

The further object of the present invention is to provide a composite metal plate surface heating unit with a back-up plate for holding the metal sheathed electrical resistance heating element in contact with the underside of the composite sheet while allowing for limited sliding movement therebetween.

A further object of the present invention is to provide a composite metal plate surface heating unit of the class described using a spot welding method of assembly that is spaced away from the resistance heating element so that the element is not integral with the composite metal plate for the entirety of the length of the heating element.

SUMMARY OF THE INVENTION

The present invention, in accordance with one form thereof, relates to a low thermal mass, solid plate surface heating unit comprising a thin plate of composite metal that has high thermal conductivity, and is also strong and oxidation and corrosion resistent. A metal sheathed electrical resistance heating element of coiled configuration is pressed against the underside of the composite metal plate. An embossed back-up plate presses the heating element against the composite metal plate, and this back-up plate is attached to the composite metal plate at a plurality of points that are remote from the heating element, but located at either side of the outermost turn of the spiral heating element so as to allow limited relative sliding movement between the heating element and the composite plate while they remain in thermal contact with each other so as to avoid warpage of the composite plate due to temperature changes between the various parts.

BRIEF DESCRIPTION OF THE DRAWINGS

This invention will be better understood from the following description taken in conjunction with the accompanying drawings and its scope will be pointed out in the appended claims.

DESCRIPTION OF THE PREFERRED EMBODIMENT

Figure 1:
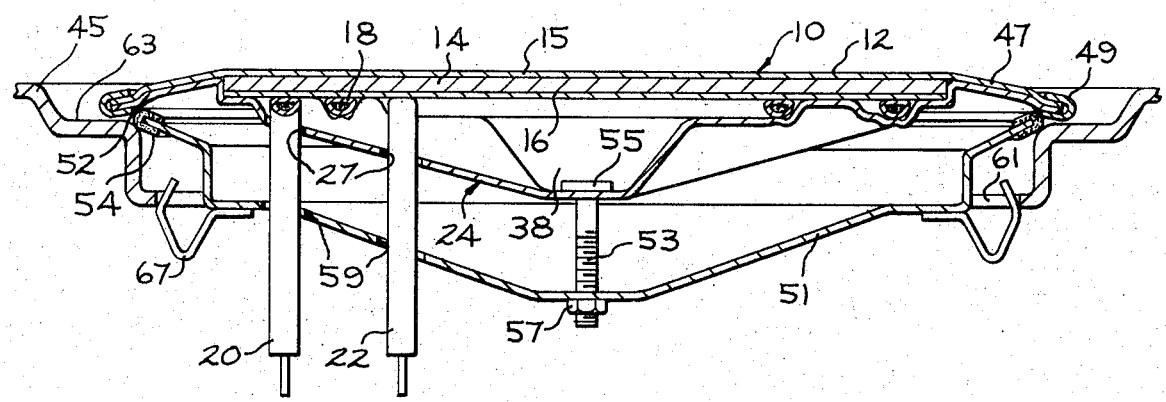
FIG. 1 is a cross-sectional elevational view through the center of a solid plate surface heating unit embodying the present invention, and the unit is shown mounted in an opening in a cooktop by means of spring clips that engage the edge of the opening.

Turning now to a consideration of the drawings, and in particular to FIG. 1, there is shown a cross-sectional elevational view of a solid plate surface heating unit 10 embodying the present invention having a top plate 12 formed of thin composite metal of high thermal conductivity with a center core 14 of material such as copper, silver, or aluminum for distributing the heat rapidly over the entire plate so as to obtain a generally uniform temperature distribution. Copper has very low strength at temperatures ranging in the vicinity of 1,400°F, and also it oxidizes very readily. Since this copper sheet 14 is of small thickness, on the order of 0.040 inches, it would also tend to warp easily under normal use conditions due to thermal stresses caused by uneven temperature distribution when using warped cooking utensils, and also due to the high temperatures to which it is exposed.

The copper core 14 is sandwiched between two thin, integral stainless steel skins 15 and 16, each of a thickness of about 0.016 inches. The copper core 14 diffuses the heat across the plate surface, thus reducing the thermal stresses considerably. The stainless steel skins 15 and 16, being on the outer surface of the composite plate provides strength to the plate. Such a plate would have only slightly lower strength than a solid stainless steel plate of a similar thickness. The composite metal plate 12 resists warpage because it combines a high strength with high heat diffusivity, which no single material can provide. The thin composite sheet material 12 of central copper core 14 and two outer stainless steel skins 15 and 16 may be formed of individual sheets which are "area welded" together as by a process of explosive welding which causes a bonding of the metal sheets along their mating surfaces.

The heat source for this solid plate surface heating unit 10 is a metal sheathed electrical resistance heating element 18 that is flattened on its topside and pressed into tight contact with the underside of the composite plate 12. Sheathed heating elements such as this have a helical resistance wire embedded in a layer of magnesium oxide which is in turn covered by the metal sheath. This heating element 18 is of coiled configuration that is arranged in a single plane, and its terminals 20 and 22 are folded down to lie in a vertical plane adjacent to each other at one side of the surface unit, as is clearly seen in FIG. 1.

Figure 2:
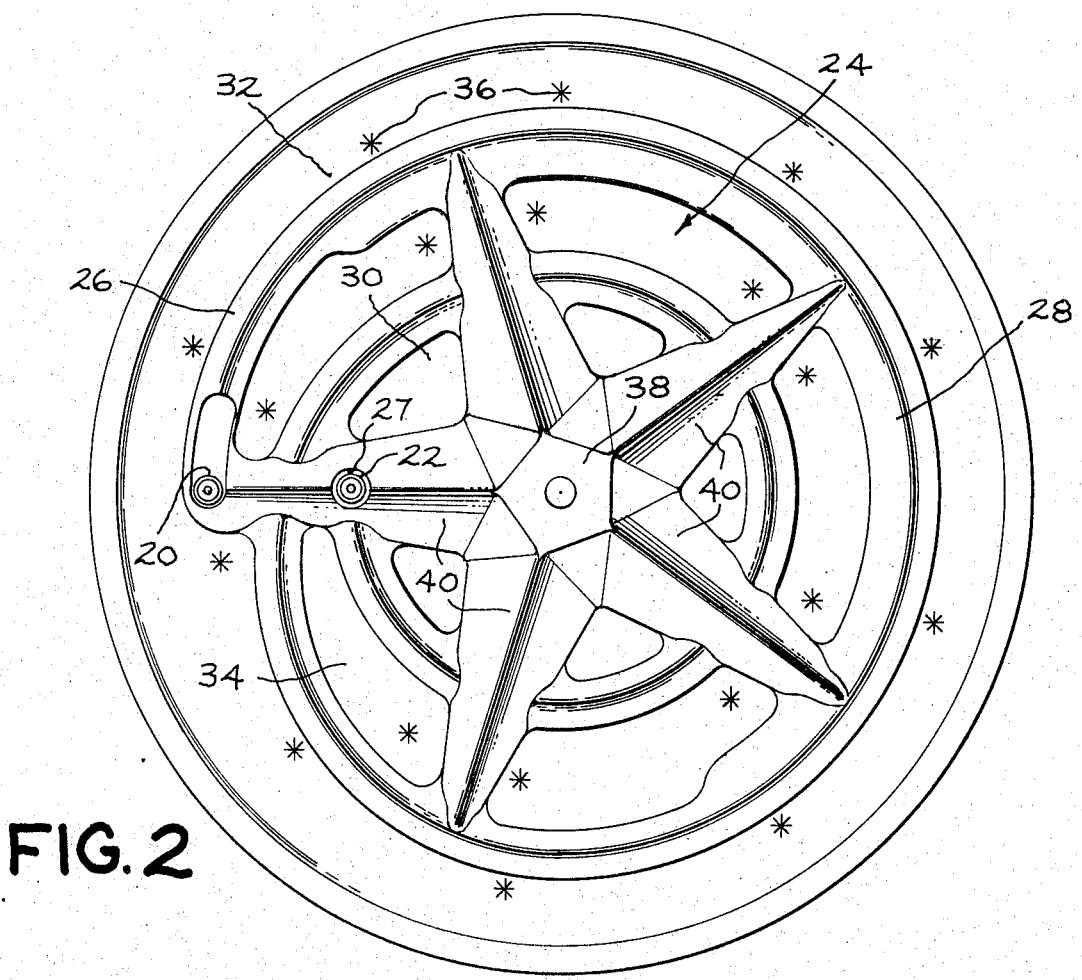
FIG. 2 is a bottom plan view of the underside of the solid plate surface heating unit with the reflector pan removed showing principally the nature of the embossed back-up plate that serves to hold the metal sheathed electrical resistance heating element pressed against the underside of the composite metal plate.

Located beneath the heating element 18 is an embossed back-up plate 24 of stainless steel or the like, which may best be understood by referring to the bottom plan view of FIG. 2. This back-up plate 24 is fashioned from a flat sheet that is stamped with a spiral recess 26 which closely overlies the spiral heating element 18. Notice in FIG. 2 that the back-up plate 24 has small access openings 27 for receiving the heating element terminals 20 and 22 therethrough. Starting with the outermost terminal 20, the spiral recess 26 may be traced in a clock-wise direction and the first turn is identified with the numeral 28. The second turn is identified with the numeral 30, and this continues until it reaches the second terminal 22, and the recess 26 ends at that point. In other words, the spiral recess starts with the one terminal 20 and it traces a double coil until it terminates at the second terminal 22. The area of the back-up plate 24 on both sides of the first turn 28 of the spiral recess 26 which receives the first turn of the heating element 18 is in direct contact with the underside of the composite plate 12.

These areas are identified by the numerals 32 and 34. These areas 32 and 34 are permanently attached to the underside of the composite sheet 12 as by spot welding at widely spaced points identified by numerals 36. This welding operation of the back-up plate 24 to the composite sheet 12 causes the spiral recess 26 to be drawn tightly over the heating element 18 so as to maintain the heating element in thermal contact with the composite metal plate at all times. However, it is understood that when the heating element 18 is energized, it would tend to elongate or open up its coils and to relax as its temperature returns to normalcy at room temperature. The present invention allows the heating element a limited amount of freedom of sliding movement relative to the composite metal sheet without breaking thermal contact with the composite sheet, thus avoiding setting up undesirable stresses and strains in the composite sheet which might otherwise tend to warp the composite sheet and reduce the amount of its surface area that would be in contact with a cooking utensil resting on the composite sheet.

In order to further reinforce the composite sheet 12, the back-up plate 24 is provided with a deep-drawn bowl formation 38 adjacent the center thereof which includes a series of tapered radial embossments 40 which are shown as being five in number to form a star-shape, where each radial embossment terminates adjacent the outmost turn 28 of the spiral recess 26.

The back-up plate 24 is made of a suitable material such as stainless steel or an alloy thereof to have a coefficient of thermal expansion that is related to the coefficient of the thermal expansion of the composite metal sheet 12 so as to compensate for temperature differences between the back-up plate 24 and the composite sheet 12. This allows both of these parts to expand substantially the same amount and thereby avoid any adverse thermal stresses between these two parts which might otherwise cause them to separate.

The method of sealing the periphery of the composite sheet 12 is considered to be a patentable invention and it is to be covered in a co-pending application Serial No. 419,593 of Bohdan Hurko and Raymond L. Dills which is being filed concurrently herewith. However, to complete an understanding of the present invention and the environment in which it functions, the edge treatment of the composite metal sheet 12 will be explained here. First, it must be understood that if the copper core 14 were exposed to the atmosphere under high temperature conditions it would tend to corrode and oxidize, resulting in premature failure of the surface unit. Second, it is important to restrict the conduction of heat from the surface unit 10 to the supporting cooktop 45 in which the surface unit 10 is mounted. Thus, it is well to stop the copper core 14 short of making thermal contact with the cooktop 45. This is done by cutting away or otherwise removing an annular strip of the bottom skin 16 and the copper core 14 for a distance of about one inch thereby leaving only the top skin 15 in that area 47. Then the peripheral strip of the embossed back-up plate 24 engages exposed edges of the copper core 14 and is in contact with the underside of the top skin 15 for the complete width of the annular strip 47. This annular strip 47 is seam welded and its peripheral edge is sealed by a folded over trim strip 49 of monel metal or the like that is also seam welded so that the copper core 14 is well sealed within the composite plate 12.

Another element of this solid plate surface unit 10 is a circular reflector pan 51 of deep-drawn configuration that is assembled beneath the composite metal sheet 12 and out of contact with the back-up plate 24 except adjacent the peripheral edge of the composite sheet 12 and the reflector pan 51 as at 52, as seen in FIG. 1. The edge of the reflector pan 51 is covered by an asbestos gasket 54. This reflector pan is assembled with the other parts of the surface unit by a single bolt 53 located adjacent the center of the back-up plate 24 and integral therewith. The bolt 53 has a head 55 that is within the back-up plate 24 and is welded to this plate. The bolt 53 is threaded, and a nut 57 is slipped over the end of the bolt and tightened to hold the reflector pan 51 firmly in place. Notice that the reflector pan 51 has small access openings 59 for receiving the heating element terminals 20 and 22 therethrough so that electrical connections may be made to the heating element 18 externally of the surface unit 10.

The cooktop 45 is provided with a recessed circular opening 61 for receiving the surface unit 10 therein. An annular recessed ledge 63 surrounds the recessed opening 61 and serves as the support means for the reflector pan 51, whereby the gasket 54 seals the opening 61 from spillage and holds the composite plate 12 off of the cooktop, and the top surface of the composite plate 12 is almost flush with the top surface of the cooktop 45. A plurality of spring clips 67 are attached to the underside of the reflector pan 51 for engaging the edge of the opening 61 and holding the surface unit 10 firmly in place.

Modifications of this invention will occur to those skilled in this art; therefore, it is to be understood that this invention is not limited to the particular embodiment disclosed, but that it is intended to cover all modifications which are within the true spirit and scope of this invention as claimed.

What is claimed as new and desired to be secured by Letters Patent of the United States is:

1. A low thermal mass, solid plate surface heating unit comprising a lightweight plate of composite metal with a center core selected from the group of high thermal conductivity metals or alloys such as copper, silver and aluminum, and an outer skin selected from the group of strong and oxidation and corrosion resisting metals or alloys such as stainless steel, nickel and chromium, a metal sheathed electrical resistance heating element of coiled configuration covering a large expanse of the underside of the composite plate, and an embossed back-up plate underlying the composite plate and attached at a plurality of spaced points to the underside of the composite plate along a major extent of the heating element while allowing for limited relative sliding movement of the heating element with respect to the composite plate under heating conditions without causing warpage of the composite plate, the said back-up plate including a spiral recess for receiving the coiled heating element therein, the area of the back-up plate at either side of the outermost turn of the heating element being attached to the composite plate at a plurality of spaced points that are remote from the heating element.

2. A solid plate surface heating unit having a thin composite metal sheet as its top utensilsupporting surface, a metal sheathed electrical resistance heating element of coiled configuration covering a large expanse of the underside of the composite metal sheet, and an embossed back-up plate for receiving the heating element therein, the back-up plate being spot welded to the composite sheet at a plurality of spaced locations that are spaced from the heating element to allow for limited sliding movement of the heating element with respect to the composite metal sheet under heating conditions without causing warpage of the composite metal sheet, said embossed back-up plate being provided with a spiral recess for receiving the said coiled heating element therein, the center portion of the back-up plate including a deep-drawn bowl having a series of tapered radial embossments which terminate adjacent the periphery of the back-up plate, said bowl and radial embossments serving to reinforce the heating unit into a rigid structure.

3. A solid plate surface heating unit as recited in claim 2 wherein the said plurality of spot welds are located on the opposite sides of the portion of the spiral recess that encompasses the outermost turn of the heating element.

4. A solid plate surface heating unit as recited in claim 3 with the addition of a reflector pan assembled beneath the back-up plate, with the area of contact between the reflector pan and the back-up plate being adjacent the periphery of each, and a centrally located fastening means connected between the back-up plate and the reflector pan for holding the assembly together.

* * * * *